United States Patent [19]

Heine et al.

[11] Patent Number: 4,565,210

[45] Date of Patent: Jan. 21, 1986

[54] THROTTLING AND SHUT-OFF VALVE FOR SLURRY PIPELINES AND THE LIKE

[75] Inventors: Otto R. Heine, Poway; Peter M. Riede, La Jolla, both of Calif.

[73] Assignee: R&H Technology, Inc., Minneapolis, Minn.

[21] Appl. No.: 649,513

[22] Filed: Sep. 11, 1984

[51] Int. Cl.[4] .............................................. F16K 1/12
[52] U.S. Cl. ..................................... 137/219; 251/122; 251/250
[58] Field of Search ................ 137/219; 251/122, 250; 406/192

[56] References Cited

U.S. PATENT DOCUMENTS

| | | | |
|---|---|---|---|
| 1,441,784 | 1/1923 | Clayton | 137/219 X |
| 2,240,119 | 4/1941 | Montgomery et al. | |
| 2,403,751 | 7/1946 | Palmer | |
| 2,507,851 | 5/1950 | Bryant et al. | 251/155 |
| 2,882,967 | 4/1959 | Surino | 162/246 |
| 4,231,389 | 11/1980 | Still et al. | 137/315 |
| 4,275,763 | 6/1981 | Fahrig | 137/613 |
| 4,413,646 | 11/1983 | Platt et al. | 251/122 X |
| 4,506,865 | 3/1985 | Bragin et al. | 406/192 X |

Primary Examiner—Gerald A. Michalsky
Attorney, Agent, or Firm—Klein & Szekeres

[57] ABSTRACT

A throttling and shut-off valve assembly for slurry pipelines and the like takes advantage of a gravity induced concentration and velocity gradient which develops in a substantially horizontal flow of coarse slurries. The throttling and shut-off valve assembly includes a conduit which is disposed substantially horizontally and wherein a valve body is mounted in an elongated streamlined housing to seat against a valve seat. The valve body is actuable to move substantially axially in the conduit. Both the valve body and the streamlined housing are disposed substantially along the longitudinal center line or axis of the conduit, which is upwardly offset relative to the longitudinal axis of the pipeline from which the flow is directed into the valve assembly. The bottom wall of the conduit is level with the bottom wall of the upstream portion of the pipeline. The valve body and the interior walls of the conduit form a channel upstream of the valve seat wherein larger space is available for flow of the slurry in the bottom of the conduit than in the top of the conduit.

16 Claims, 6 Drawing Figures

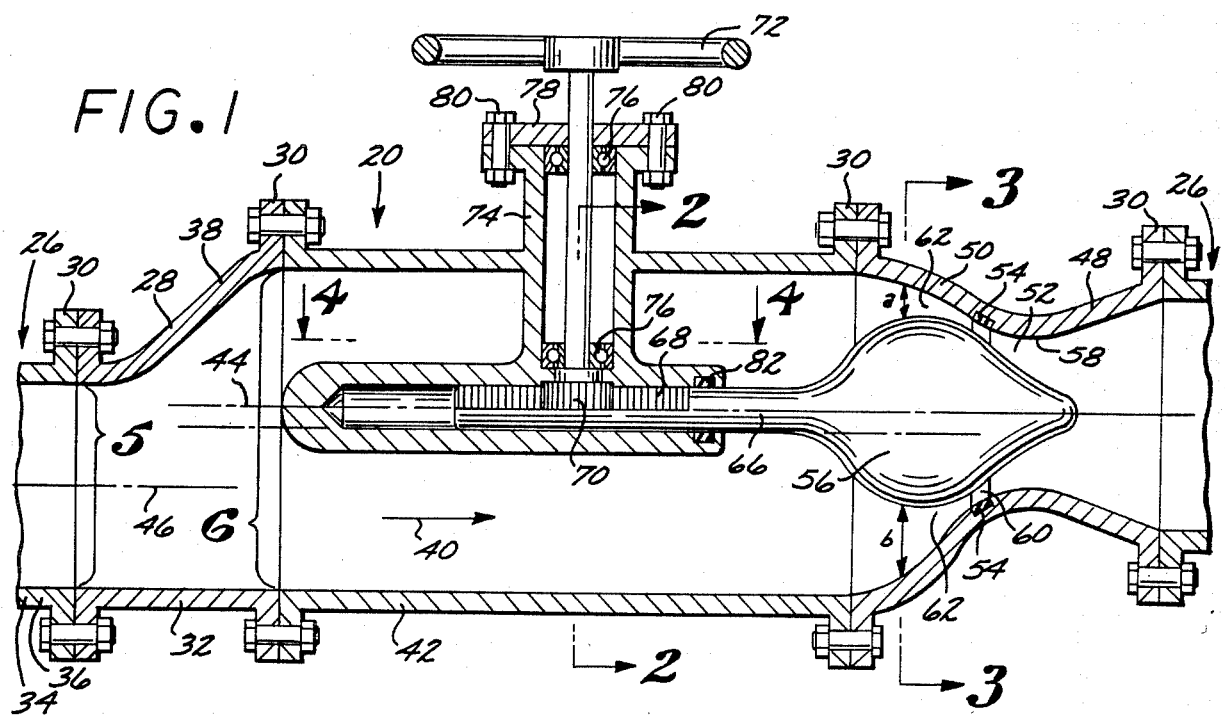

THROTTLING AND SHUT-OFF VALVE FOR SLURRY PIPELINES AND THE LIKE

BACKGROUND OF THE INVENTION

1. Field of the Invention

The present invention is directed to throttling and shut-off valves for slurry transporting pipelines and conduits. More particularly, the present invention is directed to throttling and shut-off valves for pipelines and conduits which transport relatively coarse slurries of abrasive solid particulate materials.

2. Brief Description of the Prior Art

Pipelines and conduits which transport slurries of solid particulate materials suspended in a fluid, usually liquid, carrying medium, are well known. In fact, during the recent years transportation of ground coal and other minerals in the form of aqueous, or occasionally liquid hydrocarbon based slurries has gained increasing acceptance in the energy, mining and related industries. In one type of slurry pipeline or transportation system, the coal or other mineral slurry is transported relatively short distances, for example from a mine to a nearby processing plant. In another type of slurry pipeline, minerals or coal, principally coal, is transported long distances, for example from a remote mine to an industrialized or densely populated area where the coal is to be used as an energy source.

Transporting coal and other minerals in the form of slurries, however, presents certain difficult problems with regard to wear of certain components of the pipeline and associated equipment. Pipe elbows, pumps and throttling and shut-off valves are especially wear-prone and therefore have relatively short service lives, particularly when the solid material transported as a slurry is coarse or abrasive, or both. In this regard it is noted that most mineral slurries are abrasive. Moreover, a slurry is usually considered coarse if the average particle size in the slurry exceeds approximately 1 to 2 milimeters.

Throttling and shut-off valves for coarse or abrasive slurries have been, by-and-large, limited in the prior art to gate type valves and ball valves. These valves, however, are not sufficiently abrasion resistant, and also cause an undesirable, relatively large loss of energy in the slurry flow.

Another type of slurry throttling and shut-off valve commonly used in the prior art is the elastomeric sphincter type valve, which functions relatively well for throttling the flow of fine slurries even when the solid material of the slurry is abrasive. The sphincter type valves, however, wear and deteriorate rapidly when used in pipelines transporting coarse slurries where the suspended solid material contains abrasive, sharp edged particles.

In light of the foregoing, there is a definite need in the prior art for throttling and shut-off valves of increased wear and abrasion resistance for slurry pipelines and slurry transporting conduits, particularly ones which minimize energy loss in the valve. The present invention provides such throttling and shut-off valves. U.S. Pat. Nos. 2,507,851; 2,240,119; 2,403,751; 2,882,967; 4,231,389, and 4,275,763 disclose valve or related structures which are of interest as background to the valve assembly of the present invention.

SUMMARY OF THE INVENTION

It is an object of the present invention to provide a throttling and shut-off valve assembly of improved abrasion and wear resistance for slurry transporting pipelines, conduits and the like.

It is another object of the present invention to provide a throttling and shut-off valve assembly for slurry transporting pipelines, conduits and the like which is particularly suitable for throttling the flow of coarse and abrasive slurries.

It is still another object of the present invention to provide a throttling and shut-off valve assembly for slurry transporting pipelines, conduits and the like wherein loss of kinetic energy is minimized in the slurry flow.

The foregoing and other objects and advantages are attained by a throttling and shut-off valve assembly designed to take advantage of a gravity induced concentration and velocity gradient which is normally present in a coarse slurry flowing in a substantially horizontal pipe. The valve assembly includes a conduit or pipe section mounted, normally substantially horizontally, into the pipeline wherein the slurry flows. The conduit includes a downstream portion having a valve seat and a valve body which is axially displacable in the conduit through a suitable valve actuating mechanism. In a closed position of the valve, the valve body interfaces with the valve seat to shut off the flow of the slurry in the pipeline. The valve body and the walls of the conduit are jointly configured in such a manner that upstream of the valve seat there is a larger opening available for flow of the slurry between the valve body and the conduit in the "lower" portions of the flow where the concentration of the solid particulate material in the slurry is larger and the flow velocity is slower due to gravity induced gradient, than in the "upper" portions of the flow where the concentration of the solid particulate material is smaller and the flow is faster due to the gravity induced gradient.

At least the portion of the conduit of the valve assembly of the present invention where the valve actuating mechanism is disposed has a larger cross sectional area available for flow of the slurry than the adjoining upstream section of the pipeline. The bottom wall of said portion of the conduit is substantially level with the bottom wall of the adjoining upstream section of the pipeline, so that the longitudinal center line of the conduit is upwardly offset from the longitudinal center line of the upstream section of the pipeline. The longitudinal axes of the valve actuating mechanism and of the valve body are substantially aligned with the longitudinasl axis or center line of the conduit. The result of the foregoing construction is that the valve actuating mechanism and the valve body are principally disposed in the slurry flow in an "upper" portion of the flow where the concentration of solid particulate material is relatively low due to the gravity induced concentration gradient.

The features of the present invention can be best understood, together with further objects and advantages, by reference to the following description taken in connection with the accompanying drawings wherein like numerals indicate like parts.

BRIEF DESCRIPTION OF THE DRAWINGS

FIG. 1 is a cross-sectional view of the slurry throttling and shut-off valve assembly of the present invention;

FIG. 2 is a cross-section taken on lines 2,2 of FIG. 1;

FIG. 3 is another cross-section taken on lines 3,3 of FIG. 1;

FIG. 4 is still another cross-section taken on lines 4,4 of FIG. 1;

FIG. 5 is a graph showing with a solid line a typical concentration versus elevation profile in the slurry flow in the pipeline in the cross-sectional area indicated as section 5 in FIG. 1, and showing with a dotted line a typical flow velocity versus elevation profile in the slurry flow in the cross-sectional area indicated as section 5 in FIG. 1, and FIG. 6 is a graph showing with a solid line a typical concentration versus elevation profile in the slurry flow in the valve assembly in the cross-sectional area indicated as section 6 in FIG. 1, and showing with a dotted line a typical flow velocity versus elevation profile in the slurry flow in the cross-sectional area indicated as section 6 in FIG. 1.

DESCRIPTION OF THE PREFERRED EMBODIMENT

The following specification taken in conjunction with the drawings sets forth the preferred embodiment of the present invention. The embodiments of the invention disclosed herein are the best modes contemplated by the inventors for carrying out their invention in a commercial environment, although it should be understood that various modifications can be accomplished within the scope of the present invention.

Referring now to the drawing Figures, and particularly to the cross-sectional view of FIG. 1, the preferred embodiment of the slurry throttling and shut-off valve assembly 20 of the present invention is disclosed. As it was noted above in the introductory section of the present application for patent, throttling of slurries of abrasive or coarse particulate material presents special problems in terms of rapid wear and relatively short useful service life of the valves or valve assemblies used in the pipelines transporting such slurries. Slurries of coal are often coarse, (have an average particle size of 1–2 milimeters or higher) and most minerals form abrasive slurries. Therefore, the throttling and shut-off valves of practically all slurry pipelines used in the energy and mining related industries are exposed to coarse or abrasive particles and experience rapid wear.

The throttling and shut-off valve assembly 20 of the present invention is designed principally to provide extended service life when used in conjunction with the above-noted coarse or abrasive (or both) slurries, although it may also be advantageously used in pipelines or conduits transporting fine or less abrasive slurries.

The throttling and shut-off valve assembly 20 of the present invention takes advantage of the gravity induced phenomena which are known to occur, and even predominate over hydrodynamic phenomena, in pipelines which transport coarse slurries. More specifically, it is well known that in a substantially horizontal flow of coarse slurries of heavier-than-the-fluid-carrying-medium solid materials, a gravity induced concentration gradient develops. The consequence of this gravity induced gradient is that in the "bottom" of a substantially horizontally disposed pipe section transporting the flow, the concentration of solid particulate material is greater and the flow velocity is slower than in the "top" of the pipe section. The foregoing is illustrated on FIG. 5, wherein a solid line 22 shows the concentration profile and a dotted line 24 shows the velocity profile of a "typical" coarse slurry (not shown) flowing in a typical pipe section, such as in a transport pipeline 26 to which the throttling and shut-off valve assembly 20 of the present invention is coupled. The operation and features of the present invention and the manner in which the present invention takes advantage of the above-noted gravity induced gradient phenomena are hereinafter described with specific reference to the preferred embodiment illustrated in the drawing Figures.

Thus, the preferred embodiment of the throttling and shutoff valve assembly 20 of the present invention includes a first or upstream pipe section 28 which is coupled to the pipeline 26 transporting the slurry (not shown) through a conventional flange coupling 30, or by other conventional means (not shown). The first or upstream pipe section 28 has a bottom wall 32 which is disposed substantially level with the bottom wall 34 of the upstream portion 36 of the pipeline 26. An upper wall 38 of the first or upstream pipe section 28, however, is tapered to expand gradually upwardly to provide a gradually increasing area for the flow of the slurry (not shown) in the first or upstream pipe section 28. Stated differently, the first pipe section 28 is not axisymmetrical about the direction of the flow of the slurry (not shown), rather it includes the gradually upwardly tapering top wall 38. The foregoing is well illustrated in FIG. 1; although the slurry itself is not shown, the direction of its flow is indicated by an arrow bearing the reference numeral 40.

A substantially ovally shaped conduit or pipe section 42 is attached by flange couplings 30 (or like conventional means) to the first or upstream pipe section 28. The conduit 42 is hereinafter also referred to as the mid-section 42 of the throttling and shut-off valve assembly 20 of the present invention. As is shown in FIG. 1, the width of the midsection 42 is substantially the same as the enlarged width of the first or upstream section 28, so that the average flow velocity of the slurry (not shown) is slower in the mid-section 42 than in the pipeline 26.

The dimensions of the first or upstream pipe section 28 and of the mid-section 42 are preferably selected in such a manner that in relation to the cross sectional area of the pipeline 26 the cross sectional area available for slurry flow in the mid-section 42 is approximately 1.4 to 2.0 times larger than in the pipeline 26, (or in the narrow portion of the first pipe section 28 where the cross-section approximately equals the cross-section of the pipeline 26). The conduit or mid-section 42 is substantially concentrically aligned with the enlarged portion of the asymmetrical first or upstream pipe section 28. As a consequence of the above-described geometry of the first pipe section 28 and of the mid-section 42, the longitudinal center line or axis 44 of the mid-section 42 is upwardly offset or elevated relative to the longitudinal center line or axis 46 of the upstream portion 36 of the pipeline 26.

Referring still principally to FIG. 1, a second or downstream pipe section 48 is coupled by conventional flange type couplings 30 to the mid-section 42. The second or downstream pipe section 48 is also coupled by flange type couplings 30 (or like means) to the pipeline 26. The second or downstream pipe section 48 has first inwardly and thereafter outwardly tapered walls 50 so as to form a throat or restriction 52 in the path of the flow of the slurry (not shown). The second pipe section 48 incorporates a valve seat 54 which interfaces with a valve body 56 configured to tightly fit against the valve seat 56 to substantially completely shut off the flow of the slurry (not shown) in the valve assembly 20. The valve seat 54 preferably comprises a hardfaced metal member incorporated or deposited on the interior walls 58 of the second pipe section 48. In alternative embodiments the valve seat 54 may comprise an elastomeric member (not shown).

The longitudinal axis of the valve body 56 is substantially aligned with the longitudinal center line or axis 44 of the midsection or conduit 42. The valve body 56 is axially displacable in the valve assembly 20 through an actuating mechanism which is described in more detail below. When the valve body 56 is removed from the valve seat 56, a substantially annularly shaped opening 60 is formed which permits passage of the slurry (not shown) through the opening 60. Similarly to conventional throttle valves, the further the valve body 56 is retracted from the valve seat 54, the larger is the annular opening 60 and the more slurry (not shown) is permitted to flow through the valve assembly 20.

In contrast to the prior art, however, the space 62 which is disposed between the valve body 56 and the interior walls 58 substantially immediately upstream of the valve seat 54, is not uniform around the cross sectional area of the second or downstream pipe section 48. Rather, the valve body 56 and the interior walls 58 of the second pipe section 48 are configured in such a manner that the space 62 is significantly larger in the "lower" portion of the flow than in the "upper" portion of the flow, whereby a larger area is available for the flow towards the "bottom" of the valve assembly 20 where the slurry flow is slower and more highly concentrated with solid particulate material (not shown) than towards the "top" of the valve assembly 20 where the flow is faster and less concentrated with solid particulate material (not shown). This is illustrated on FIGS. 1 and 3, where distance "a" is shorter than distance "b".

Preferably, in accordance with the present invention, as in the herein described preferred embodiment, the valve body 56 and the interior walls 58 of the second pipe section 48 are configured to form the space 62 with a gradually decreasing width towards the "top" of the second pipe section 48, as is best shown on FIG. 3. Moreover, preferably the space 62 is approximately 1.4 to 2.1 times larger (area wise) in the bottom than in the top of the pipe section 48.

In the area of the valve seat 54, however, both the valve seat 54 and the matching valve body 56 should form substantially perfect circles; otherwise good seating of the valve body 56 on the valve seat 54 becomes very difficult to achieve.

Axial movement of the valve body 56 is accomplished through the above-noted valve acutating mechanism which includes an elongated hydrodynamically streamlined housing 64 disposed in the mid-section 42 of the valve assembly 20. The streamlined housing 64 receives an elongated stem 66 of the valve body 56 which carries a rack 68, shown on FIG. 1. The streamlined housing 64 and the stem 66, just as the valve body 56, have their longitudinal axes disposed in substantial alignment with the longitudinal axis 44 of the mid-section 42.

The rack 68 on the stem 66 of the valve body 56 meshes with a pinion gear 70 attached to a handle 72 disposed in a handle housing 74. The handle housing 74 is substantially at a right angle to the streamlined housing 64. Suitble bearings 76 are incorporated in the handle housing 74 to permit rotation of the handle 72 by an operator (not shown) to linearly move the valve body 56 relative to the valve seat 54. The handle housing 74 is closed on the exterior of the valve assembly 20 by a plate 78 secured by bolts 80. A suitable elastomeric, or like, seal 82 is incorporated in the streamlined housing 64 to seal against the valve stem 66 and to prevent entry of carrier fluid (not shown) or solid particulate material (not shown) into the streamlined housing 64.

In other embodiments (not shown) of the valve assembly 20 of the present invention, means other than the handle 72 may be employed to actuate the valve body 56. For example, the handle 72 may be replaced by a gear or gear assembly (not shown), and the valve assembly 20 may be remotely controlled.

The operation and principal advantages of the above disclosed valve assembly 20 should become readily apparent to those skilled in the art from the foregoing disclosure. Briefly summarized here for the sake of completeness, the flow of the slurry (not shown) containing coarse particulate material (not shown) such as coal or minerals (not shown) in a liquid (usually aqueous) carrier medium (not shown) enters the valve assembly 20 through the first or upstream pipe section 28. In the gradually widening upstream pipe section 28 the flow decelerates considerably. The declerated flow which, however, still has a concentration and velocity gradient, (schematically shown on FIG. 6), enters the mid-section 42 wherein the elongated streamlined housing 64 for the valve actuating mechanism and a portion of the valve body 56 are disposed. Because the streamlined housing 64 and valve body 56 are located along the longitudinal axis of the mid-section 42 which is upwardly offset from the upstream section 36 of the pipeline 26, both the valve body 56 and the housing 64 are in an area of the flow where the concentration of solid particulate material (not shown) is diminished due to the gravity induced concentration gradient in the flow. The foregoing results in decreased wear and increased service life of the valve assembly 20 of the present invention.

Moreover, due to the above-described and novel configuration of the interior walls 58 and of the valve body 56, as the flow of the slurry (not shown) proceeds towards the valve seat 54 and the throat 52, there is more space available for the "concentrated" and "slow" flow in the bottom of the valve assembly 20 than for the less concentrated and faster flow in the top of the valve assembly 20. This phenomenon also contributes significantly toward lesser wear and increased service life of the valve assembly 20.

Still further, the overall configuration of the valve assembly 20 of the present invention, and the geometry and mounting of the several individual components thereof result in relatively low resistance to the flow of the slurry, and therefore in relatively low energy loss.

Several modification of the herein described slurry throttling and shut-off valve assembly 20 may become readily apparent to those skilled in the art in light of the foregoing disclosure. Therefore, the scope of the present invention should be interpreted solely from the following claims.

What is claimed is:

1. A valve system particularly adapted for controlling the flow of a fluid entraining solid particulate material of the type which has a gravity induced concentration gradient in a substantially horizontally moving flow, the valve system comprising:

a conduit for the fluid having an upstream end and a downstream end;

first means for serially connecting the upstream end of the conduit to a pipeline wherein the fluid flows;

second means for serially connecting the downstream end of the conduit to the pipeline, the conduit being normally disposed substantially horizontally when it is operatively connected to the pipeline by said first and second means, whereby a gravity induced concentration gradient of solid particulate material normally develops in the flow, an upstream non-throttled portion of the conduit having a cross-sectional area available for fluid flow which is significantly larger than the cross-sectional area of the pipeline, and the longitudinal center line of the conduit being upwardly displaced relative to the center line of the upstream section of the pipeline and the bottom wall of the conduit being substantially level with the bottom wall of the pipeline;

a valve seat incorporated in the conduit;

valve means disposed in the conduit, adapted and configured for being axially displaced in the conduit, for sealingly engaging the valve seat in a closed position of the valve means, the valve means and the walls of the conduit jointly comprising means for forming an opening upstream of the valve seat between the valve means and the walls of the conduit, the opening being smaller in the upper cross-sectional area of the conduit than in a lower cross-sectional area, whereby the portion of the fluid having greater concentration of entrained solid particulate material passes through a larger opening than the portion of the fluid having lesser concentration of solid particulate material.

2. The valve system of claim 1 wherein the longitudinal axis of the axially displacable valve means coincides with the longitudinal center line of the conduit.

3. The valve system of claim 2 further comprising valve means actuating means for axially moving the valve means in the conduit, the valve means actuating means including a hydrodynamically streamlined housing disposed substantially axially along the center line of the conduit.

4. The valve system of claim 3 wherein the valve means include an elongated stem, the valve means actuating means include a handle housing connected to the streamlined housing and wherein the streamlined housing and the handle housing jointly incorporate a rack and pinion assembly which is operatively connected to the stem of the valve means.

5. The valve system of claim 4 wherein the conduit comprises a first pipe section which is connected to the upstream portion of the pipeline and which comprises means for upwardly offsetting the center line of the conduit relative to the center line of the upstream portion of the pipeline, a mid-section incorporating the valve means actuating means, and a second pipe section connected to the downstream portion of the pipeline, the second pipe section incorporating the valve seat and having its center line substantially aligned with the center line of the downstream portion of the pipeline, the first pipe section, the mid-section and the second pipe section being attached to one another and being in serial fluid communication with one another.

6. The valve system of claim 5 wherein the first means comprise a flange incorporated in the first pipe section and wherein the second means comprise another flange incorporated in the second pipe section.

7. A throttle and shut-off valve assembly adapted for controlling the flow of a slurry of solid particulate material entrained in a carrier fluid, particularly for a slurry of the type wherein a concentration gradient of the entrained solid particulate material is induced by gravity in a substantially horizontal flow, the valve assembly comprising:

a conduit having a first upstream portion having an asymmetrical tapered wall portion comprising means for gradually increasing the cross sectional area of the conduit, a substantially straight mid-portion having a substantially uniform cross sectional area which substantially corresponds to the maximum cross sectional area of the upstream portion, a downstream portion incorporating a valve seat, the upstream portion having first means for joining the conduit to a pipeline wherein the slurry is transported, and the downstream portion having second means for joining the conduit to the pipeline, the conduit being normally connected to the pipeline in a substantially horizontal position, in said position the longitudinal center line of the mid-portion being upwardly offset relative to the longitudinal center line of the upstream portion of the pipeline, and the bottom of the mid-portion being substantially level with the bottom of the first portion;

a valve body adapted to be seated in the valve seat to shut off the flow of the slurry in the conduit, said valve body having its longitudinal axis disposed substantially along the center line of the mid-portion of the conduit, having an elongated stem and being axially displacable in the conduit and being configured to comprise together with walls of the downstream portion means for creating upstream of the valve seat an opening for flow of the slurry which opening is significantly larger in a first area where the concentration of the slurry is maximal than in a second area where the concentration of the slurry is minimal due to the gravity induced concentration gradient in the slurry, and valve actuating means operatively connected to the valve body for axially displacing the valve body in the conduit, the valve actuating means comprising a hydrodynamically streamlined housing for the stem of the valve body and a second housing for an actuating member, the second housing being connected to the streamlined housing and protruding from the conduit.

8. The throttle and shut-of valve assembly of claim 7 wherein the maximum cross sectional area of the upstream portion is approximately 1.4 to 2.0 times larger than the minimum cross sectional area of the upstream portion.

9. The throttle and shut-off valve assembly of claim 8 wherein the minimum cross sectional area of the upstream portion is approximately equal to the cross sectional area of the adjoining pipeline.

10. The throttle and shut-off valve assembly of claim 7 wherein the first and the second means comprise flanges.

11. The throttle and shut-off valve of claim 7 wherein the upstream portion and the downstream portion are removably attachable to the mid-portion.

12. The throttle and shut-off valve of claim 7 wherein the opening for flow of the slurry in the first area is approximately 1.4 to 2.1 times larger than the opening for flow of the slurry in the second area.

13. In a throttling and shut-off valve assembly for a fluid and solid particulate material entrained in the fluid, the valve assembly including a conduit serially connected to a pipeline carrying the flow of the fluid and the entrained particulate material, a valve seat incorporated in the conduit and a valve body which is substantially axially displaceable in the conduit to seat against the valve seat to shut off the flow in the conduit, and to be retracted from the valve seat to permit the flow to pass in a substantially annular opening formed between the valve body and the valve seat, and externally actuable valve actuating means partially disposed within the conduit for displacing the valve body relative to the valve seat, the improvement comprising:

means for configuring a channel between the valve body and the walls of the conduit upstream of the valve seat, to form a larger area available for the flow in the lower portion of the channel than in the upper portion of the channel, said upper and lower portions defined in a substantially horizontal position of the conduit, whereby the concentration of the solid particulate material is greatest and where the flow velocity is slowest due to gravity induced concentration and velocity gradient in the flow, and whereby the smaller area available for the flow is disposed where the concentration of the solid particulate material is smallest and where the flow velocity is fastest due to the gravity induced concentration and velocity gradient, and a portion of the conduit is located upstream of the valve body, which portion has an asymmetrical tapered wall gradually increasing the cross section of the conduit available for the flow from a cross section substantially corresponding to the cross section of the adjoining pipeline to at least approximately 1.4 times larger cross section in the conduit where the valve actuating means are disposed, the bottom wall of the conduit being substantially level with the bottom wall of said portion having the tapered wall, the longitudinal axis of the valve body being substantially aligned with the longitudinal center line of the conduit, whereby the valve body is disposed in an area of the flow where concentration of solid particulate material is decreased due to the gravity induced concentration gradient in the flow.

14. The improvement of claim 13 wherein the larger area available for the flow is approximately 1.4 to 2.1 times larger than the smaller area available for the flow.

15. The improvement of claim 13 wherein the valve actuating means comprise a hydrodynamically streamlined housing operatively connected with the valve body, the streamlined housing having its longitudinal axis disposed substantially along the longitudinal center line of the conduit.

16. In a throttling and shut-off valve for a slurry comprising a fluid and solid particulate material entrained in the fluid, the valve including a conduit serially connected to a pipeline carrying the slurry, said conduit normally being disposed in a substantially horizontal position for operation of the valve, a valve seat incorporated in the conduit and a valve body which is substantially axially displacable in the conduit to seat against the valve seat to shut-off flow of the slurry in the conduit, and to be retracted from the valve seat to permit flow of the slurry in a substantially annular opening formed between the valve body and the valve seat, and externally actuable valve actuating means partially disposed within the conduit for displacing the valve body relative to the valve seat, the improvement comprising:

means for positioning the longitudinal center line of the conduit upwardly offset from the longitudinal center line of the upstream section of the pipeline to which the conduit is connected, the conduit having a bottom wall which is substantially level with the bottom wall of the upstream section of the pipeline and having substantially larger cross sectional area available for flow of the slurry than the pipeline;

means for forming a channel between the valve body and interior walls of the conduit to provide a larger area available for flow of the slurry in the lower portion of the channel than in the upper portion of the channel, said upper and lower portions being defined in a substantially horizontal position of the conduit, whereby the larger area available for flow of the slurry is disposed where the concentration of the solid particulate material is greater and were the flow velocity is slower due to gravity induced concentration and velocity gradient in the flow of the slurry, and whereby the smaller area available for flow of the slurry is disposed where the concentration of the solid particular material is smaller and where the flow velocity is faster due to gravity induced concentration and velocity gradient in the flow of the slurry, and means for positioning the valve body and the valve actuating means substantially longitudinally aligned with the longitudinal center line of the conduit, whereby the valve body and the valve actuating means are disposed in an area of the flow of the slurry where the concentration of solid particulate material is diminished due to the gravity induced concentration gradient in the slurry.

* * * * *